United States Patent
Yamasaki et al.

(10) Patent No.: US 8,854,577 B2
(45) Date of Patent: Oct. 7, 2014

(54) POLARIZER-PROTECTING FILM COMPRISING AN EASY-ADHESION LAYER COMPOSITION, AND POLARIZING PLATE AND IMAGE DISPLAY APPARATUS EACH COMPRISING THE POLARIZING-PROTECTING FILM

(75) Inventors: Tatsuya Yamasaki, Osaka (JP); Takeshi Saitou, Osaka (JP); Hiroyuki Takao, Osaka (JP); Youichirou Sugino, Osaka (JP); Yuuji Yamashita, Osaka (JP)

(73) Assignees: Nitto Denko Corporation, Ibaraki-shi (JP); Nippon Shokubai Co., Ltd., Osaka-shi (JP)

( * ) Notice: Subject to any disclaimer, the term of this patent is extended or adjusted under 35 U.S.C. 154(b) by 109 days.

(21) Appl. No.: 13/056,447

(22) PCT Filed: Jun. 1, 2009

(86) PCT No.: PCT/JP2009/059967
§ 371 (c)(1),
(2), (4) Date: Mar. 17, 2011

(87) PCT Pub. No.: WO2010/013539
PCT Pub. Date: Feb. 4, 2010

(65) Prior Publication Data
US 2011/0157525 A1 Jun. 30, 2011

(30) Foreign Application Priority Data
Jul. 29, 2008 (JP) ................. 2008-194287

(51) Int. Cl.
*G02F 1/1335* (2006.01)
*G02B 5/30* (2006.01)
*B32B 27/40* (2006.01)
*B32B 27/30* (2006.01)
*B32B 27/20* (2006.01)
*B32B 7/12* (2006.01)
*B32B 27/08* (2006.01)

(52) U.S. Cl.
CPC .......... *B32B 27/08* (2013.01); *G02F 1/133528* (2013.01); *G02F 2201/50* (2013.01); *G02B 5/305* (2013.01); *G02B 5/3025* (2013.01); *G02F 2202/28* (2013.01); *B32B 27/40* (2013.01); *B32B 27/30* (2013.01); *B32B 27/20* (2013.01); *B32B 7/12* (2013.01)
USPC ....................................................... 349/96

(58) Field of Classification Search
CPC ................. G02B 5/3025; G02F 2201/50
USPC .................................... 349/96–102
See application file for complete search history.

(56) References Cited

U.S. PATENT DOCUMENTS 7,675,587 B2  3/2010  Sugiyama et al.
8,030,434 B2  10/2011  Ikeda et al.

(Continued)

FOREIGN PATENT DOCUMENTS

CN  1667069 A  9/2005
CN  1742053 A  3/2006

(Continued)

OTHER PUBLICATIONS

International Search Report of PCT/JP2009/059967, date of mailing Sep. 1, 2009.

(Continued)

*Primary Examiner* — Paul Lee
(74) *Attorney, Agent, or Firm* — Westerman, Hattori, Daniels & Adrian, LLP

(57) ABSTRACT

The present invention provides a polarizer protective film capable of suppressing blocking that occurs in taking up the film. The polarizer protective film of the present invention includes a (meth)acrylic resin film and an easy-adhesion layer formed of an easy-adhesive composition including a urethane resin and fine particles. The fine particles include preferably colloidal silica.

6 Claims, 1 Drawing Sheet

(56) References Cited

U.S. PATENT DOCUMENTS

| | | |
|---|---|---|
| 2005/0202196 A1 | 9/2005 | Katoh et al. |
| 2006/0027322 A1 | 2/2006 | Sugiyama et al. |
| 2006/0132922 A1* | 6/2006 | Takao et al. .................. 359/601 |
| 2006/0148970 A1 | 7/2006 | Kuba et al. |
| 2008/0100780 A1* | 5/2008 | Suzuki et al. .................. 349/96 |
| 2008/0125524 A1 | 5/2008 | Ishida et al. |
| 2008/0318034 A1* | 12/2008 | Murakami et al. ............ 428/336 |
| 2009/0016209 A1 | 1/2009 | Ikeda et al. |
| 2009/0059369 A1* | 3/2009 | Otome et al. .................. 359/500 |
| 2009/0153965 A1 | 6/2009 | Ito et al. |

FOREIGN PATENT DOCUMENTS

| | | | | |
|---|---|---|---|---|
| CN | 101111545 A | | 1/2008 | |
| CN | 101120271 A | | 2/2008 | |
| CN | 101156092 A | | 4/2008 | |
| JP | 9-197128 A | | 7/1997 | |
| JP | 9-325329 A | | 12/1997 | |
| JP | 2001302994 A | * | 10/2001 | ................ C09J 7/02 |
| JP | 2004300379 A | * | 10/2004 | ................ C08J 7/04 |
| JP | 2005-232197 A | | 9/2005 | |
| JP | 2006-201736 A | | 8/2006 | |
| JP | 2007-127893 A | | 5/2007 | |
| WO | WO 2006112223 A1 | * | 10/2006 | ................ G02B 1/10 |

OTHER PUBLICATIONS

Chinese Office Action dated May 3, 2012, issued in corresponding Chinese Patent Application No. 200980129960.5, with English translation (16 pages).

Japanese Office Action dated Mar. 27, 2013, issued in corresponding Japanese Patent Application No. 2009-129915, with English translation (6 pages).

Chinese Office Action dated May 15, 2014, issued in corresponding Chinese Patent Application No. 200980129960.5, w/English translation (17 pages).

* cited by examiner (a)
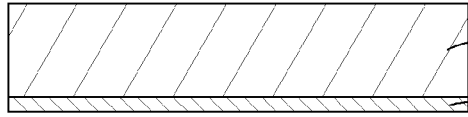
(b)
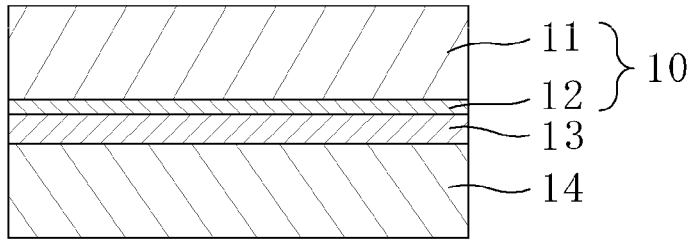
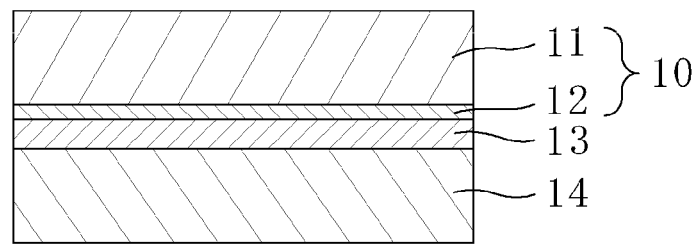

POLARIZER-PROTECTING FILM COMPRISING AN EASY-ADHESION LAYER COMPOSITION, AND POLARIZING PLATE AND IMAGE DISPLAY APPARATUS EACH COMPRISING THE POLARIZING-PROTECTING FILM

TECHNICAL FIELD

The present invention relates to a polarizer protective film, and a polarizing plate and an image display apparatus each using the polarizer protective film. More specifically, the present invention relates to a polarizer protective film capable of suppressing blocking that occurs in taking up the film.

BACKGROUND ART

In a liquid crystal display apparatus as a typical image display apparatus, owing to an image forming system of the apparatus, it is indispensable to place polarizing plates on both sides of a liquid crystal cell. The polarizing plate usually has a configuration in which polarizer protective films are attached to both surfaces of a polarizer with an adhesive. As a material for forming the polarizer protective film, there is proposed an acrylic resin film. Further, in order to enhance adhesion between the polarizer and the acrylic resin film, it is proposed to provide an easy-adhesion layer between the polarizer and the acrylic resin film (for example, Patent Literature 1). However, there is a problem that blocking occurs in the step of taking up the polarizer protective film provided with the easy-adhesion layer in a roll shape.

CITATION LIST

Patent Literature

[PTL 1] JP 2007-127893 A

SUMMARY OF INVENTION

Technical Problem

The present invention has been made for solving the above-mentioned conventional problem, and a main object of the present invention is to provide a polarizer protective film capable of suppressing blocking that occurs in taking up the film.

Means for Solving the Problems

According to one aspect of the present invention, a polarizer protective film is provided. The polarizer protective film includes a (meth)acrylic resin film and an easy-adhesion layer formed of an easy-adhesive composition including a urethane resin and fine particles.

In one embodiment of the invention, the urethane resin has a carboxyl group.

In another embodiment of the invention, the fine particles include colloidal silica.

In still another embodiment of the invention, the fine particles have a particle diameter of 10 to 200 nm.

In still another embodiment of the invention, the fine particles are included in an amount of 0.3 to 10 parts by weight with respect to 100 parts by weight of the urethane resin.

In still another embodiment of the invention, the (meth)acrylic resin has a lactone ring structure.

In still another embodiment of the invention, a side of the (meth)acrylic resin film on which the easy-adhesion layer is formed is subjected to corona discharge treatment or plasma treatment.

According to another aspect of the present invention, a polarizing plate is provided. The polarizing plate includes a polarizer and the polarizer protective film.

According to still another aspect of the present invention, an image display apparatus is provided. The image display apparatus includes the polarizing plate.

Advantageous Effects of Invention

According to the present invention, there can be provided the polarizer protective film which effectively suppresses blocking that occurs in taking up the film and which is excellent in take-up property by the formation of an easy-adhesion layer with an easy-adhesive composition including a urethane resin and fine particles. Specifically, the formation of an easy-adhesion layer with an easy-adhesive composition including a urethane resin and fine particles allows minute unevenness to be formed on the surface of the easy-adhesion layer, to thereby reduce a friction force on a contact surface between a (meth)acrylic resin film and the easy-adhesion layer and/or between the easy-adhesion layers. As a result, there can be provided the polarizer protective film which is capable of effectively preventing the occurrence of defects such as wrinkles and wrinkle marks even without using inserting paper and which is excellent in take-up property, in the step of taking up the polarizer protective film in a roll shape.

BRIEF DESCRIPTION OF DRAWINGS

FIG. 1(a) is a schematic cross-sectional view of a polarizer protective film according to one preferred embodiment of the present invention, and FIG. 1(b) is a schematic cross-sectional view of a polarizing plate according to one preferred embodiment of the present invention.

DESCRIPTION OF EMBODIMENTS

Hereinafter, description is made of preferred embodiments of the present invention, but the present invention is not limited to these embodiments.

A. Entire Configuration of Polarizer Protective Film and Polarizing Plate

FIG. 1(a) is a schematic cross-sectional view of a polarizer protective film according to a preferred embodiment of the present invention. A polarizer protective film 10 includes a (meth)acrylic resin film 11 and an easy-adhesion layer 12. FIG. 1(b) is a schematic cross-sectional view of a polarizing plate according to a preferred embodiment of the present invention. A polarizing plate 100 includes a polarizer 14, an adhesive layer 13, and a polarizer protective film 10 in this order. The polarizer 14 is placed on the easy-adhesion layer 12 side of the polarizer protective film 10. Although not shown, practically, the polarizing plate 100 includes a second polarizer protective film laminated on the side of the polarizer 14 opposite to the polarizer protective film 10 via an adhesive layer.

A-1. (Meth)Acrylic Resin Film

The above-mentioned (meth)acrylic resin film includes a (meth)acrylic resin. The (meth)acrylic resin film is obtained, for example, by subjecting a forming material including a resin component including a (meth)acrylic resin as a main component to extrusion.

The glass transition temperature (Tg) of the above-mentioned (meth)acrylic resin is preferably 115° C. or more, more preferably 120° C. or more, still more preferably 125° C. or more, particularly preferably 130° C. or more. When the (meth)acrylic resin film includes a (meth)acrylic resin having a glass transition temperature (Tg) of 115° C. or more as a main component, the film can have excellent durability. The upper limit value of Tg of the above-mentioned (meth)acrylic resin is not particularly limited. However, the value is preferably 170° C. or less in view of forming property and the like.

Any appropriate (meth)acrylic resin may be adopted as the above-mentioned (meth)acrylic resin. Examples thereof include poly(meth)acrylates such as polymethyl methacrylate, a methyl methacrylate-(meth)acrylic acid copolymer, a methyl methacrylate-(meth)acrylate copolymer, a methyl methacrylate-acrylate-(meth)acrylic acid copolymer, a methyl (meth)acrylate-styrene copolymer (such as an MS resin), and polymers each having an alicyclic hydrocarbon group (such as a methyl methacrylate-cyclohexyl methacrylate copolymer and a methyl methacrylate-norbornyl (meth) acrylate copolymer). Of those, a poly $C_{1-6}$ alkyl (meth)acrylate such as polymethyl (meth)acrylate is preferably given. A methyl methacrylate-based resin including methyl methacrylate as a main component (50 to 100% by weight, preferably 70 to 100% by weight) is more preferably given.

Specific examples of the above-mentioned (meth)acrylic resin include an Acrypet VH and an Acrypet VRL20A manufactured by Mitsubishi Rayon Co., Ltd., and a (meth)acrylic resin having a high Tg value obtained through intramolecular cross-linking or an intramolecular cyclization reaction.

In the present invention, a (meth)acrylic resin having a glutaric anhydride structure, a (meth)acrylic resin having a lactone ring structure, and a (meth)acrylic resin having a glutarimide structure are each preferably used as the above-mentioned (meth)acrylic resin because the resins each have high heat resistance, high transparency, and high mechanical strength.

Examples of the (meth)acrylic resin having a glutaric anhydride structure include (meth)acrylic resins each having a glutaric anhydride structure described in, for example, JP 2006-283013 A, JP 2006-335902 A, and JP 2006-274118 A.

Examples of the (meth)acrylic resin having a lactone ring structure include (meth)acrylic resins each having a lactone ring structure described in, for example, JP 2000-230016 A, JP 2001-151814 A, JP 2002-120326 A, JP 2002-254544 A, and JP 2005-146084 A.

Examples of the (meth)acrylic resin having a glutarimide structure include (meth)acrylic resins each having a glutarimide structure described in, for example, JP 2006-309033 A, JP 2006-317560 A, JP 2006-328329 A, JP 2006-328334 A, JP 2006-337491 A, JP 2006-337492 A, JP 2006-337493 A, JP 2006-337569 A, and JP 2007-009182 A.

The content of the above-mentioned (meth)acrylic resin in the (meth)acrylic resin film is preferably 50 to 100% by weight, more preferably 50 to 99% by weight, still more preferably 60 to 98% by weight, particularly preferably 70 to 97% by weight. When the content of the above-mentioned (meth)acrylic resin in the (meth)acrylic resin film is less than 50% by weight, high heat resistance and high transparency inherent in the (meth)acrylic resin may not be sufficiently reflected.

The content of the above-mentioned (meth)acrylic resin in the forming material to be used upon forming of the (meth) acrylic resin film is preferably 50 to 100% by weight, more preferably 50 to 99% by weight, still more preferably 60 to 98% by weight, particularly preferably 70 to 97% by weight. When the content of the above-mentioned (meth)acrylic resin in the forming material to be used upon forming of the (meth) acrylic resin film is less than 50% by weight, high heat resistance and high transparency inherent in the (meth)acrylic resin may not be sufficiently reflected.

In addition to the above-mentioned (meth)acrylic resins, the (meth)acrylic resin film may include other thermoplastic resins. Examples of the other thermoplastic resin include: olefin-based polymers such as polyethylene, polypropylene, an ethylene-propylene copolymer, and poly(4-methyl-1-pentene); halogenated vinyl-based polymers such as vinyl chloride, vinylidene chloride, and a chlorinated vinyl resin; acrylic polymers such as polymethyl methacrylate; styrene-based polymers such as polystyrene, a styrene-methyl methacrylate copolymer, a styrene-acrylonitrile copolymer, and an acrylonitrile-butadiene-styrene block copolymer; polyesters such as polyethylene terephthalate, polybutylene terephthalate, and polyethylene naphthalate; polyamides such as nylon 6, nylon 66, and nylon 610; polyacetal; polycarbonate; polyphenylene oxide; polyphenylene sulfide; polyether ether ketone; polysulfone; polyether sulfone; polyoxybenzylene; polyamideimide; and rubber polymers such as an ABS resin and an ASA resin blended with polybutadiene-based rubber and acrylic rubber.

The content ratio of the other thermoplastic resin in the (meth)acrylic resin film is preferably 0 to 50% by weight, more preferably 0 to 40% by weight, still more preferably 0 to 30% by weight, particularly preferably 0 to 20% by weight.

The (meth)acrylic resin film may include an additive. Examples of the additive include hindered phenol-based, phosphorus-based, and sulfur-based antioxidants; stabilizers such as alight stabilizer, a weathering stabilizer, and a heat stabilizer; reinforcing materials such as glass fibers and carbon fibers; UV-absorbing agents such as phenyl salicylate, (2,2'-hydroxy-5-methylphenyl)benzotriazole, and 2-hydroxybenzophenone; a near infrared ray absorbing agent; flame retardants such as tris(dibromopropyl) phosphate, triallyl phosphate, and antimony oxide; antistatic agents such as anionic, cationic, and nonionic surfactants; colorants such as an inorganic pigment, an organic pigment, and a dye; an organic filler and an inorganic filler; a resin modifier; an organic filling agent and an inorganic filling agent; a plasticizer; a lubricant; an antistatic agent; a flame retardant; and a retardation reducing agent.

The content ratio of the additive in the (meth)acrylic resin film is preferably 0 to 5% by weight, more preferably 0 to 2% by weight, still more preferably 0 to 0.5% by weight.

Although a method of producing a (meth)acrylic resin film is not particularly limited, for example, a (meth)acrylic resin and another polymer, additive, or the like are thoroughly mixed by any suitable mixing method to obtain a thermoplastic resin composition previously, and then the composition may be formed into a film. Alternatively, the (meth)acrylic resin and the another polymer, additive, or the like are formed into separate solutions. After that, the solutions are mixed to obtain a homogenous mixed solution, and then, the solution may be formed into a film.

For producing the above-mentioned thermoplastic resin composition, for example, the above-mentioned film materials are preblended with any suitable mixer such as an omni mixer, and then, the obtained mixture is extruded and kneaded. In this case, the mixer to be used for extrusion and kneading is not particularly limited, and for example, any suitable mixer such as a uniaxial extruder, a biaxial extruder, a pressure kneader may be used.

Examples of the above-mentioned method of forming a film include any suitable film forming methods such as a solution casting method, a melt extrusion method, a calendaring method, and a compression forming method. Of those film forming methods, a solution casting method and a melt extrusion method are preferred.

Examples of a solvent to be used in the above-mentioned solution casting method include aromatic hydrocarbons such as benzene, toluene, and xylene; aliphatic hydrocarbons such as cyclohexane and decalin; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethylformamide; and dimethylsulfoxide. These solvents may be used alone or in combination.

Examples of an apparatus for performing the above-mentioned solution casting method include a drum-type casting machine, a band-type casting machine, and a spin coater.

Examples of the above-mentioned melt extrusion method include a T-die method and an inflation method. The forming temperature is preferably 150 to 350° C., more preferably 200 to 300° C.

In the case of forming a film by the above-mentioned T-die method, a T-die is attached to a tip end of a known uniaxial extruder or a biaxial extruder, and a film extruded in a film shape is taken up to obtain a roll-shaped film. At this time, when a stretching force is applied in an extrusion direction while appropriately adjusting the temperature of a take-up roll, the film may be also stretched uniaxially. Further, when a film is stretched in a direction perpendicular to the extrusion direction, simultaneous biaxial stretching, sequential biaxial stretching, or the like may also be performed.

The (meth)acrylic resin film may be any of an unstretched film and a stretched film. In the case where the film is a stretched film, the film may be any of a uniaxially stretched film and a biaxially stretched film. In the case where the film is a biaxially stretched film, the film may be any of a simultaneously biaxially stretched film and a sequentially biaxially stretched film. In the case where the film is stretched biaxially, the mechanical strength and film performance are enhanced. When another thermoplastic resin is mixed into the (meth) acrylic resin film, a retardation may be prevented from increasing even if the film is stretched, and hence, optical isotropy may be held.

The stretching temperature is preferably in the vicinity of a glass transition temperature of a thermoplastic resin composition that is a film material, and specifically, the temperature is preferably (glass transition temperature−30° C.) to (glass transition temperature+100° C.), more preferably (glass transition temperature−20° C.) to (glass transition temperature+80° C.). When the stretching temperature is less than (glass transition temperature−30° C.), there is a possibility that a sufficient stretching ratio may not be obtained. On the contrary, when the stretching temperature exceeds (glass transition temperature+100° C.), flow of the resin composition occurs, which may prevent stable stretching.

The stretching ratio defined in an area ratio is preferably 1.1 to 25 times, more preferably 1.3 to 10 times. The stretching ratio of less than 1.1 times may not lead to the enhancement of toughness involved in stretching. When the stretching ratio exceeds 25 times, the effect to be obtained by enhancing the stretching ratio may not be recognized.

The stretching speed is preferably 10 to 20,000%/min., more preferably 100 to 10,000%/min. in one direction. When the stretching speed is less than 10%/min., it takes time to obtain a sufficient stretching ratio and a production cost may be high. When the stretching speed exceeds 20,000%/min., a stretched film may, for example, be broken.

The (meth)acrylic resin film may be subjected to heat treatment (annealing) or the like after stretching treatment in order to stabilize its optical isotropy and mechanical characteristics. As the conditions of the heat treatment, any suitable conditions may be adopted.

The thickness of the (meth)acrylic resin film is preferably 5 to 200 µm, more preferably 10 to 100 µm. When the thickness is less than 5 µm, crimping may be increased when the durability test of the polarizing plate is conducted, in addition to the decrease in strength. When the thickness exceeds 200 µm, moisture permeability as well as transparency are degraded, and in the case of using a water-based adhesive, the drying speed of water that is a solvent of the water-based adhesive may be decreased.

The wetting tension of the surface of the (meth)acrylic resin film is preferably 40 mN/m or more, more preferably 50 mN/m or more, still more preferably 55 mN/m or more. When the wetting tension of the surface is at least 40 mN/m or more, the adhesion strength between the (meth)acrylic resin film and the polarizer is further enhanced. In order to adjust the wetting tension of the surface, any suitable surface treatment may be performed. Examples of the surface treatment include corona discharge treatment, plasma treatment, ozone spraying, UV-ray irradiation, flame treatment, and chemical treatment. Of those, corona discharge treatment and plasma treatment are preferably used.

A-2. Easy-Adhesion Layer

The above-mentioned easy-adhesion layer is formed of an easy-adhesive composition including a urethane resin and fine particles. The formation of the easy-adhesion layer with the easy-adhesive composition as described above may provide a polarizer protective film which effectively suppresses blocking that occurs in taking up the film and which is excellent in take-up property. Further, an easy-adhesion layer excellent in adhesiveness to a (meth)acrylic resin film may be obtained by using a urethane resin. The easy-adhesive composition is preferably a water-based composition. The water-based composition may be excellent in an environment aspect and workability, compared with a solvent-based composition.

The above-mentioned urethane resin is typically obtained by reacting polyol with polyisocyanate. The polyol is not particularly limited as long as it has two or more hydroxyl groups in a molecule, and any suitable polyol may be adopted. Examples of the polyol include polyacrylic polyol, polyester polyol, and polyether polyol. They may be used alone or in combination.

The above-mentioned polyacrylic polyol is typically obtained by copolymerizing a (meth)acrylic acid ester and a monomer having a hydroxyl group. Examples of the (meth) acrylic acid ester include methyl (meth)acrylate, butyl (meth) acrylate, 2-ethylhexyl (meth)acrylate, and cyclohexyl (meth) acrylate. Examples of the monomer having a hydroxyl group include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and 2-hydroxypentyl (meth) acrylate; (meth)acrylic acid monoesters of polyalcohols such as glycerine and trimethylolpropane; and N-methylol (meth) acrylamide. They may be used alone or in combination.

In addition to the above-mentioned monomer components, other monomers may be copolymerized to the above-mentioned polyacrylic polyol. Any appropriate monomers may be adopted as the other monomers as long as they are copolymerizable. Specific examples include unsaturated monocarboxylic acids such as (meth)acrylic acid; unsaturated dicarboxylic acids such as maleic acid, and anhydrides and mono- or di-esters thereof; unsaturated nitriles such as (meth)acrylonitrile; unsaturated amides such as (meth)acrylamide and N-methylol (meth)acrylamide; vinyl esters such as vinyl acetate and vinyl propionate; vinyl ethers such as methyl vinyl ether; α-olefins such as ethylene and propylene; halogenated α,β-unsaturated aliphatic monomers such as vinyl chloride and vinylidene chloride; and α,β-unsaturated aromatic monomers such as styrene and α-methylstyrene. They may be used alone or in combination.

The above-mentioned polyester polyol is typically obtained by reacting a polybasic acid component with a polyol component. Examples of the polybasic acid component include aromatic dicarboxylic acids such as orthophthalic acid, isophthalic acid, telephthalic acid, 1,4-naphthalene dicarboxylic acid, 2,5-naphthalene dicarboxylic acid, 2,6-naphthalene dicarboxylic acid, biphenyl dicarboxylic acid, and tetrahydrophthalic acid; aliphatic dicarboxylic acids such as oxalic acid, succinic acid, malonic acid, glutaric acid, adipic acid, pimelic acid, suberic acid, azelaic acid, sebacic acid, decane dicarboxylic acid, dodecane dicarboxylic acid, octadecane dicarboxylic acid, tartaric acid, alkyl succinic acid, linoleic acid, maleic acid, fumaric acid, mesaconic acid, citraconic acid, and itaconic acid; alicyclic dicarboxylic acids such as hexahydrophthalic acid, tetrahydrophthalic acid, 1,3-cyclohexane dicarboxylic acid, and 1,4-cyclohexane dicarboxylic acid; and reactive derivatives such as acid anhydrides, alkyl esters, and acid halides thereof. They may be used alone or in combination.

Examples of the above-mentioned polyol component include ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 1-methyl-1,3-butylene glycol, 2-methyl-1,3-butylene glycol, 1-methyl-1,4-pentylene glycol, 2-methyl-1,4-pentylene glycol, 1,2-dimethyl-neopentyl glycol, 2,3-dimethyl-neopentyl glycol, 1-methyl-1,5-pentylene glycol, 2-methyl-1,5-pentylene glycol, 3-methyl-1,5-pentylene glycol, 1,2-dimethylbutylene glycol, 1,3-dimethylbutylene glycol, 2,3-dimethylbutylene glycol, 1,4-dimethylbutylene glycol, diethylene glycol, triethylene glycol, polyethylene glycol, dipropylene glycol, polypropylene glycol, 1,4-cyclohexane dimethanol, 1,4-cyclohexanediol, bisphenol A, bisphenol F, hydrogenated bisphenol A, and hydrogenated bisphenol F. They may be used alone or in combination.

The above-mentioned polyether polyol is typically obtained by ring-opening addition polymerization of an alkylene oxide to a polyalcohol. Examples of the polyalcohol include ethylene glycol, diethylene glycol, propylene glycol, dipropylene glycol, glycerine, and trimethylolpropane. Examples of the alkylene oxide include ethylene oxide, propylene oxide, butylene oxide, styrene oxide, and tetrahydrofuran. They may be used alone or in combination.

Examples of the above-mentioned polyisocyanate include aliphatic diisocyanates such as tetramethylene diisocyanate, dodecamethylene diisocyanate, 1,4-butane diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate; alicyclic diisocyanates such as isophorone diisocyanate, hydrogenated xylylene diisocyanate, 4,4'-cyclohexylmethane diisocyanate, 1,4-cyclohexanediisocyanate, methylcyclohexylene diisocyanate, and 1,3-bis(isocyanatomethyl)cyclohexane; aromatic diisocyanates such as tolylene diisocyanate, 2,2'-diphenylmethane diisocyanate, 2,4'-diphenylmethane diisocyanate, 4,4'-diphenylmethane diisocyanate, 4,4'-diphenyldimethylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate; and aromatic aliphatic diisocyanates such as dialkyldiphenylmethane diisocyanate, tetraalkyldiphenylmethane diisocyanate, and α,α,α,α-tetramethylxylylene diisocyanate. They may be used alone or in combination.

The above-mentioned urethane resin preferably has a carboxyl group. Due to the presence of the carboxyl group, a polarizer protective film excellent in adhesiveness (particularly, under a high temperature and humidity condition) to the polarizer may be provided. The urethane resin having a carboxyl group may be obtained, for example, by reacting a chain extender having a free carboxyl group in addition to the above-mentioned polyol and polyisocyanate. Examples of the chain extender having a free carboxyl group include dihydroxycarboxylic acid and dihydroxysuccinic acid. Examples of the dihydroxycarboxylic acid include dialkylolalkanoic acids such as dimethylolalkanoic acid (e.g., dimethylolacetic acid, dimethylolbutanoic acid, dimethylolpropionic acid, dimethylolbutyric acid, dimethylolpentanoic acid). They may be used alone or in combination.

In the production of the above-mentioned urethane resin, in addition to the above-mentioned components, other polyols and other chain extenders may be reacted. Examples of the other polyols include polyols having three or more hydroxyl groups such as sorbitol, 1,2,3,6-hexanetetraol, 1,4-sorbitan, 1,2,4-butanetriol, 1,2,5-pentanetriol, glycerine, trimethylolethane, trimethylolpropane, and pentaerithritol. Examples of the other chain extenders include glycols such as ethylene glycol, diethylene glycol, triethylene glycol, 1,3-propanediol, 1,3-butanediol, 1,4-butanediol, neopentyl glycol, pentanediol, 1,6-hexanediol, and propylene glycol; aliphatic diamines such as ethylene diamine, propylene diamine, hexamethylene diamine, 1,4-butane diamine, and aminoethylethanol amine; alicyclic diamines such as isophorone diamine and 4,4'-dicyclohexylmethane diamine; and aromatic diamines such as xylylene diamine and tolylene diamine.

As a method of producing the above-mentioned urethane resin, any suitable method may be adopted. Specific examples thereof include a one-shot method involving reacting each of the above-mentioned components at a time and a multistage method involving reacting the components in stages. In the case where the urethane resin has a carboxyl group, the multistage method is preferably used. This is because the carboxyl group may be introduced easily. It should be noted that, in the production of the above-mentioned urethane resin, any suitable urethane reaction catalyst may be used.

In the case where the above-mentioned easy-adhesive composition is a water-based composition, a neutralizer is preferably used in the production of the above-mentioned urethane resin. Improvement in stability of the urethane resin in water is obtainable by using a neutralizer. Examples of the neutralizer include ammonia, N-methylmorpholine, triethylamine, dimethylethanolamine, methyldiethanolamine, triethanolamine, morpholine, tripropylamine, ethanolamine, triisopropanolamine, and 2-amino-2-methyl-1-propanol. They may be used alone or in combination.

In the case where the above-mentioned easy-adhesive composition is a water-based composition, at the time of the production of the urethane resin, an organic solvent which is inert with respect to the above-mentioned polyisocyanate and is compatible with water is preferably used. Examples of the organic solvent include ester-based solvents such as ethyl acetate, butyl acetate, and ethyl cellosolve acetate; ketone-based solvents such as acetone, methyl ethyl ketone, and methyl isobutyl ketone; and ether-based solvents such as dioxane, tetrahydrofuran, and propylene glycol monomethyl ether. They may be used alone or in combination.

The number average molecular weight of the above-mentioned urethane resin is preferably 5,000 to 600,000, more preferably 10,000 to 400,000. The acid value of the above-mentioned urethane resin is preferably 10 or more, more preferably 10 to 50, particularly preferably 20 to 45. When the acid value is in such range, the adhesiveness to the polarizer may be more excellent.

As the above-mentioned fine particles, any suitable fine particles may be used. Preferably, the fine particles are water-dispersible fine particles. Specifically, any of inorganic fine particles and organic fine particles may be used. Examples of the inorganic fine particles include inorganic oxides such as silica, titania, alumina, and zirconia, calcium carbonate, talc, clay, calcined kaolin, calcined calcium silicate, hydrated calcium silicate, aluminum silicate, magnesium silicate, and calcium phosphate. Examples of the organic fine particles include a silicone resin, a fluorine resin, and a (meth)acrylic resin. Of those, silica is preferred for the following reasons. Silica may be further excellent in blocking suppressing performance and transparency, does not cause haze, and is not colored. Thus, silica less influences the optical properties of a polarizing plate. Silica also has satisfactory dispersibility and dispersion stability with respect to an easy-adhesive composition, and hence may be more excellent in workability during formation of an easy-adhesion layer. Further, silica is also excellent in adhesiveness to a (meth)acrylic resin film.

The particle diameter (average primary particle diameter) of each of the above-mentioned fine particles is preferably 10 to 200 nm, more preferably 20 to 60 nm. When fine particles each having such particle diameter are used, unevenness is formed appropriately on the surface of the easy-adhesion layer, which may reduce effectively a friction force on a contact surface between the (meth)acrylic resin film and the easy-adhesion layer and/or between the easy-adhesion layers. Consequently, the fine particles may be further excellent in blocking suppressing performance. Further, when the average primary particle diameter is smaller than a visible light wavelength and is as small as possible, the light scattering by the particles can be suppressed, which may further suppress the influence on the optical properties of the polarizing plate.

In the case where the above-mentioned easy-adhesive composition is a water-based composition, the above-mentioned fine particles are preferably compounded as aqueous dispersions. Specifically, in the case of adopting silica as the fine particles, silica is preferably compounded as colloidal silica. As the colloidal silica, commercially available colloidal silica may be used as it is. Examples of the commercially available colloidal silica include Quotron PL series produced by FUSO CHEMICAL CO., LTD., Snowtechs series produced by NISSAN CHEMICAL INDUSTRIES LTD., and AERODISP series and AEROSIL series produced by Nippon Aerosil Co., Ltd.

The above-mentioned easy-adhesive composition preferably includes a cross-linking agent. As the cross-linking agent, any suitable cross-linking agent may be adopted. Specifically, in the case where the above-mentioned urethane resin has a carboxyl group, preferred examples of the cross-linking agent include a polymer having a group capable of reacting with a carboxyl group. Examples of the group capable of reacting with a carboxyl group include an organic amino group, an oxazoline group, an epoxy group, and a carbodiimide group. Preferably, the cross-linking agent has an oxazoline group. Of those, the cross-linking agent having an oxazoline group has a long pot life at room temperature when mixed with the above-mentioned urethane resin and proceeds with a cross-linking reaction when heated, and hence, has satisfactory workability.

As the above-mentioned polymer, any suitable polymer may be adopted. Examples of the polymer include an acrylic polymer and a styrene acrylic polymer. The polymer is preferably an acrylic polymer. When the acrylic polymer is used, the adhesiveness to the polarizer be further enhanced. Further, the acrylic polymer may be stably compatibilized with a water-based easy-adhesive composition, and may be cross-linked with the above-mentioned urethane resin satisfactorily.

The above-mentioned easy-adhesive composition may further include any suitable additive. Examples of the additive include an antiblocking agent, a dispersion stabilizer, a thixotropic agent, an antioxidant, a UV-absorbing agent, an antifoaming agent, a thickener, a dispersant, a surfactant, a catalyst, a filler, a lubricant, and an antistatic agent.

As described above, the easy-adhesive composition is preferably a water-based composition. The concentration of the urethane resin in the easy-adhesive composition is preferably 1.5 to 15% by weight, more preferably 2 to 10% by weight. This is because the workability during formation of the easy-adhesion layer may be excellent. The content of the cross-linking agent (solid content) in the easy-adhesive composition is preferably 1 to 30 parts by weight, more preferably 3 to 20 parts by weight with respect to 100 parts by weight of the urethane resin (solid content). When the content is set to 1 part by weight or more, the adhesiveness to the polarizer may be excellent. On the other hand, when the content is set to 30 parts by weight or less, a retardation may be prevented from being expressed in the easy-adhesion layer. The content of the fine particles (solid content) in the easy-adhesive composition is preferably 0.3 to 10 parts by weight, and more preferably 0.6 to 3 parts by weight with respect to 100 parts by weight of the urethane resin (solid content: in the case of including a cross-linking agent, solid content including a cross-linking agent). Specifically, the content of the fine particles in the easy-adhesion layer is preferably 0.3 to 10 parts by weight, more preferably 0.6 to 3 parts by weight with respect to 100 parts by weight of the resin solid content. When the content is set in such range, unevenness is formed appropriately on the surface of the easy-adhesion layer, and a friction force on a contact surface between the (meth)acrylic resin film and the easy-adhesion layer and/or between the easy-adhesion layers may be reduced effectively. As a result, more excellent blocking suppressing performance may be obtained. Further, influence on the optical properties of the polarizing plate may be further suppressed. It should be noted that a method of forming the easy-adhesion layer is described later in the item B.

The thickness of the above-mentioned easy-adhesion layer may be set to any suitable value. The thickness is preferably 0.1 to 10 µm, more preferably 0.1 to 5 µm, particularly preferably 0.2 to 1.5 µm. When the thickness is set in such range, the adhesiveness to the polarizer may be excellent and a retardation may be prevented from being expressed in the easy-adhesion layer.

A friction coefficient of the above-mentioned (meth)acrylic resin film and the easy-adhesion layer is preferably 0.1 to 0.6, more preferably 0.2 to 0.4.

A-3. Polarizer

As the above-mentioned polarizer, any suitable polarizer may be adopted depending upon purposes. Examples of the polarizer include a uniaxially stretched hydrophilic polymer film, such as a polyvinyl alcohol-based film, a partially folmarized polyvinyl alcohol-based film, or an ethylene-vinyl acetate copolymer-based, partially saponified film, with a dichroic substance such as iodine or a dichroic dye adsorbed thereto; and a polyene-based orientation film of a dehydrated product of polyvinyl alcohol or a dehydrochlorinated product of polyvinyl chloride. Of those, a polarizer of a uniaxially stretched polyvinyl alcohol-based film with a dichroic substance such as iodine adsorbed thereto is particularly preferred due to its high polarization dichroic ratio. The thickness of these polarizers is generally about 1 to 80 µm, although not particularly limited.

A polarizer of a uniaxially stretched polyvinyl alcohol-based film with iodine adsorbed thereto can be produced, for example, by soaking polyvinyl alcohol in an aqueous solution of iodine to dye the polyvinyl alcohol and stretching the polyvinyl alcohol 3 to 7 times its original length. As required, the polarizer may include boric acid, zinc sulfate, zinc chloride, and the like, and can be soaked in an aqueous solution of potassium iodide or the like. Further, as required, the polyvinyl alcohol-based film may be soaked in water and washed with water before being dyed.

Washing the polyvinyl alcohol-based film with water can not only remove contamination and an antiblocking agent on the surface of the polyvinyl alcohol-based film, but also has an effect of preventing non-uniformity such as unevenness of dying by allowing the polyvinyl alcohol-based film to swell. The polyvinyl alcohol-based film may be stretched after or while being dyed with iodine. Alternatively, the polyvinyl alcohol-based film may be dyed with iodine after being stretched. The polyvinyl alcohol-based film can also be stretched even in an aqueous solution of boric acid or potassium iodide or in a water bath.

A-4. Adhesive Layer

As an adhesive forming the above-mentioned adhesive layer, any suitable adhesive may be adopted. Preferably, the adhesive layer is formed of an adhesive composition including a polyvinyl alcohol-based resin.

Examples of the above-mentioned polyvinyl alcohol-based resin include a polyvinyl alcohol resin and a polyvinyl alcohol resin including an acetoacetyl group. Preferably, the polyvinyl alcohol-based resin is a polyvinyl alcohol resin including an acetoacetyl group. This is because the adhesiveness between the polarizer and the (meth)acrylic resin film may be further enhanced to thereby enhance the durability.

Examples of the above-mentioned polyvinyl alcohol-based resin include a saponified product of polyvinyl acetate; derivatives of the saponified product; a saponified product of a copolymer obtained by copolymerizing vinyl acetate with a monomer having copolymerizability with vinyl acetate; and a modified polyvinyl alcohol obtained by modifying polyvinyl alcohol to acetal, urethane, ether, graft, phosphate, or the like. Examples of the monomer include: unsaturated carboxylic acids such as maleic (anhydride), fumaric acid, crotonic acid, itaconic acid, and (meth)acrylic acid and esters thereof; α-olefins such as ethylene and propylene; (sodium) (meth) allylsulfonate; sodium sulfonate (monoalkylmalate); sodium disulfonate alkylmalate; N-methylol acrylamide; alkali salts of acrylamide alkylsulfonate; N-vinylpyrrolidone; and derivatives of N-vinylpyrrolidone. They may be used alone or in combination.

The average polymerization degree of the above-mentioned polyvinyl alcohol-based resin is, from the viewpoint of an adhesion, preferably 100 to 5,000, more preferably 1,000 to 4,000. The average saponification degree is, from the viewpoint of an adhesion, preferably 85 to 100 mol %, more preferably 90 to 100 mol %.

The above-mentioned polyvinyl alcohol-based resin including an acetoacetyl group is obtained by, for example, causing the polyvinyl alcohol-based resin and diketene to react with each other by any method. Specific examples of the method include: a method involving dispersing the polyvinyl alcohol-based resin in a solvent such as acetic acid, and adding diketene to the dispersion; a method involving dissolving the polyvinyl alcohol-based resin in a solvent such as dimethylformamide or dioxane, and adding diketene to the solution; and a method involving directly bringing diketene gas or liquid diketene into contact with the polyvinyl alcohol-based resin.

A degree of acetoacetyl group modification of the above-mentioned polyvinyl alcohol-based resin including an acetoacetyl group is typically 0.1 mol % or more, preferably about 0.1 to 40 mol %, more preferably 1 to 20 mol %, particularly preferably 2 to 7 mol %. A degree of acetoacetyl group modification of less than 0.1 mol % may provide insufficient water resistance. A degree of acetoacetyl group modification of more than 40 mol % provides a small effect of improving the water resistance. It should be noted that the degree of acetoacetyl group modification is a value measured by NMR.

The above-mentioned adhesive composition may include a cross-linking agent. Any appropriate cross-linking agent may be adopted as the cross-linking agent. A compound having at least two functional groups each having reactivity to the above-mentioned polyvinyl alcohol-based resin is preferably used. Examples of the compound include: alkylene diamines each having an alkylene group and two amino groups, such as ethylene diamine, triethylene diamine, and hexamethylene dimamine; isocyanates such as tolylene diisocyanate, hydrogenated tolylene diisocyanate, a trimethylol propane tolylene diisocyanate adduct, triphenylmethane triisocyanate, methylene bis(4-phenylmethane)triisocyanate, isophorone diisocyanate, and ketoxime blocked compounds or phenol blocked compounds thereof; epoxies such as ethylene glycol diglycidyl ether, polyethylene glycol diglycidyl ether, glycerin di- or triglycidyl ether, 1,6-hexane diol diglycidyl ether, trimethylol propane triglycidyl ether, diglycidyl aniline, and diglycidyl amine; monoaldehydes such as formaldehyde, acetaldehyde, propione aldehyde, and butyl aldehyde; dialdehydes such as glyoxal, malondialdehyde, succinedialdehyde, glutardialdehyde, maleic dialdehyde, and phthaldialdehyde; an amino-formaldehyde resin such as a condensate of formaldehyde with methylol urea, methylol melamine, alkylated methylol urea, alkylated methylol melamine, acetoguanamine, or benzoguanamine; and salts of divalent or trivalent metals such as sodium, potassium, magnesium, calcium, aluminum, iron, and nickel and oxides thereof. Of those, an amino-formaldehyde resin and dialdehides are preferred. As the amino-formaldehyde resin, a compound having a methylol group is preferred, and as the dialdehydes, glyoxal is preferred. Of those, the compound having a methylol group is preferred, and methylol melamine is particularly preferred.

The blending amount of the above-mentioned cross-linking agent may be set appropriately depending upon the kinds of the above-mentioned polyvinyl alcohol-based resin and the like. Typically, the blending amount of the cross-linking agent is about 10 to 60 parts by weight, preferably 20 to 50 parts by weight with respect to 100 parts by weight of the polyvinyl alcohol-based resin. This is because, with such blending amount, an excellent adhesion may be obtained. When the blending amount of the cross-linking agent is large, the reaction of the cross-linking agent proceeds in a short period of time, and the adhesive tends to be gelled. Consequently, the pot life as the adhesive becomes extremely short, which may cause the industrial use to be difficult.

The above-mentioned adhesive composition may include a metal compound colloid. The metal compound colloid may have a configuration in which metal compound fine particles are dispersed in a disperse medium, and may be electrostatically stabilized due to the repulsion between the same kind of charges of the fine particles and have stability perpetually. Owing to the inclusion of such metal compound colloid, for example, there may be obtained an adhesive composition excellent in stability even in the case where the blending amount of the above-mentioned cross-linking agent is large.

The average particle diameter of the fine particles forming the above-mentioned metal compound colloid may be any appropriate value as long as it does not have an adverse effect on the optical properties such as polarization characteristics. The average particle diameter is preferably 1 to 100 nm, more preferably 1 to 50 nm. This is because, with such diameter, the fine particles may be dispersed uniformly in the adhesive layer to ensure an adhesion and the occurrence of knick defects may be suppressed. The term "knick defects" refer to light leakage.

As the above-mentioned metal compound, any suitable compound may be adopted. Examples of the compound include metal oxides such as alumina, silica, zirconia, and titania; metal salts such as aluminum silicate, calcium carbonate, magnesium silicate, zinc carbonate, barium carbonate, and calcium phosphate; and minerals such as cerite, talc, clay, and kaolin. According to the present invention, a metal compound colloid that is positively charged is used preferably, as descried later. Examples of the metal compound include alumina and titania, and alumina is particularly preferred.

The above-mentioned metal compound colloid is typically present in a state of colloid solution, dispersed in a disperse medium. Examples of the disperse medium include water and alcohols. The solid content in the colloid solution is typically about 1 to 50% by weight, preferably 1 to 30% by weight. The colloid solution may include nitric acid, hydrochloric acid, and acetic acid as a stabilizer.

The blending amount of the above-mentioned metal compound colloid (solid content) is preferably 200 parts by weight or less, more preferably 10 to 200 parts by weight, still more preferably 20 to 175 parts by weight, most preferably 30 to 150 parts by weight with respect to 100 parts by weight of the polyvinyl alcohol-based resin. This is because the metal compound colloid in such blending amount may suppress the occurrence of knick defects while ensuring an adhesion.

The above-mentioned adhesive composition may include a coupling agent such as a silane coupling agent or a titanium coupling agent, various tackifiers, a UV-absorbing agent, an antioxidant, a heat-resistant stabilizer, and a hydrolysis-resistant stabilizer.

The form of the above-mentioned adhesive composition is preferably an aqueous solution (resin solution). The resin concentration is preferably 0.1 to 15% by weight, more preferably 0.5 to 10% by weight in terms of applicability, shelf stability, and the like. The viscosity of the resin solution is preferably 1 to 50 mPa·s. In the case where the above-mentioned metal compound colloid is included, the occurrence of knick defects may be effectively suppressed even in the range of a low viscosity of 1 to 20 mPa·s. The pH of the resin solution is preferably 2 to 6, more preferably 2.5 to 5, still more preferably 3 to 5, most preferably 3.5 to 4.5. Usually, the surface charge of the above-mentioned metal compound colloid may be controlled by adjusting the pH. The surface charge is preferably a positive charge. The presence of a positive charge may further suppress the occurrence of knick defects. It should be noted that the surface charge may be checked, for example, by measuring the zeta potential with a zeta potential measurement apparatus.

As a method of preparing the above-mentioned resin solution, any suitable method may be adopted. In the case where the resin solution includes the above-mentioned cross-linking agent and metal compound colloid, for example, a method of mixing a polyvinyl alcohol-based resin with a cross-linking agent previously and adjusting the mixture to an appropriate concentration, and blending a metal compound colloid with the mixture thus obtained is adopted. Alternatively, after mixing a polyvinyl alcohol-based resin with a metal compound colloid, a cross-linking agent may be mixed with the mixture while considering a use period and the like. It should be noted that the concentration of the resin solution may be adjusted after the resin solution is prepared.

The thickness of the adhesive layer formed of the above-mentioned adhesive composition may be set to any suitable value depending upon, for example, the composition of the adhesive composition and the like. The thickness is preferably 10 to 300 nm, more preferably 10 to 200 nm, particularly preferably 20 to 150 nm. This is because sufficient adhesive strength may be obtained.

A-5. Other

As the above-mentioned second polarizer protective film, any suitable protective film may be adopted. Typical examples of a material forming the second polarizer protective film include cellulose-based polymers such as diacetylcellulose and triacetylcellulose. The second polarizer protective film may be formed of the same material as that for the (meth)acrylic resin film described in the above-mentioned item A-1. The adhesive layer provided between the above-mentioned polarizer and second polarizer protective film may be formed of any suitable adhesive. As the adhesive, the adhesive composition described in the above-mentioned item A-4 may be used.

B. Production Method

As a method of producing a polarizer protective film of the present invention, any suitable method may be adopted. Hereinafter, one embodiment is described. For example, the easy-adhesion layer is previously formed on one side of the (meth)acrylic resin film. The easy-adhesion layer is formed typically by applying the above-mentioned easy-adhesive composition to one side of the (meth)acrylic resin film, followed by drying. As a method of applying the easy-adhesive composition, any suitable method may be adopted. Examples of the method include a bar coating method, a roll coating method, a gravure coating method, a rod coating method, a slot orifice coating method, a curtain coating method, and a fountain coating method. The drying temperature is typically 50° C. or more, preferably 90° C. or more, more preferably 110° C. or more. When the drying temperature is set in such range, a polarizing plate excellent in color fastness (particularly, under a high temperature and humidity conditions) may be provided. The drying temperature is preferably 200° C. or less, more preferably 180° C. or less.

As described above, at least one side (the side on which the easy-adhesion layer is formed) of the (meth)acrylic resin film may be subjected to surface treatment. In this case, before the easy-adhesion layer is formed, surface treatment is performed. The specific example of the surface treatment is as described in the above-mentioned item A-1. The surface treatment is preferably corona discharge treatment or plasma treatment. When the (meth)acrylic resin film is subjected to the corona discharge treatment, the adhesion and adhesiveness between the polarizer and the (meth)acrylic resin film may be further enhanced. The corona discharge treatment is performed under any suitable conditions. For example, the corona discharge electron irradiation amount is preferably 50 to 150 W/m²/min., more preferably 70 to 100 W/m²/min.

It should be noted that, in the case where the above-mentioned (meth)acrylic resin film is a stretched film, the stretching treatment may be performed before or after an easy-adhesion layer is formed. Preferably, after the above-mentioned easy-adhesive composition is applied to the above-mentioned (meth)acrylic resin film, the (meth)acrylic resin film is stretched. This is because both the stretching treatment of the film and the drying of the easy-adhesive composition can be performed concurrently by doing so.

The polarizing plate of the present invention is typically produced by laminating the above-mentioned polarizer protective film and the above-mentioned polarizer via an adhesive layer. Here, the polarizer protective film is laminated so that the easy-adhesion layer thereof be at the side of the polarizer. Specifically, a method involving applying the above-mentioned adhesive composition to one side of any one of the polarizer and the polarizer protective film, and then attaching the polarizer and the polarizer protective film to each other, followed by drying, is given. Examples of a method of applying an adhesive composition include a roll method, a spray method, and a soaking method. Further, in the case where the adhesive composition includes a metal compound colloid, the adhesive composition is applied so that the thickness of the adhesive composition after being dried becomes larger than an average particle diameter of the metal compound colloid. The drying temperature is typically 5 to 150° C., preferably 30 to 120° C. The drying time is typically 120 seconds or more, preferably 300 seconds or more.

C. Image Display Apparatus

The image display apparatus of the present invention includes the polarizing plate of the present invention. Specific examples of the image display apparatus include self-luminous type display apparatuses such as an electroluminescence (EL) display, a plasma display (PD), and a field emission display (FED), and a liquid crystal display apparatus. The liquid crystal display apparatus includes a liquid crystal cell and the above-mentioned polarizing plate placed on at least one side of the liquid crystal cell.

EXAMPLES

Hereinafter, the present invention is specifically described by way of examples, but the present invention is not limited by the examples. It should be noted that the evaluation method for the optical properties was performed as follows.
<Optical Properties>

An in-plane retardation $\Delta nd$ a thickness direction retardation Rth were measured using KOBRA-WPR produced by Oji Scientific Instruments Co., Ltd. A visible light transmittance (total light transmittance) was measured using NDH-1001DP produced by Nippon Denshoku Industries Co., Ltd.

Example 1

(Production of Polarizer)

A polyvinyl alcohol film having a thickness of 75 μm was soaked in hot water at 28° C. for 60 seconds to be swollen. Next, the polyvinyl alcohol film was soaked in an aqueous solution including iodine and potassium iodide (weight ratio 1:10) and dyed so as to obtain a predetermined single axis transmittance while being stretched by 3.3 times. Then, the resultant polyvinyl alcohol film was soaked in an aqueous solution including 3% by weight of boric acid and 2% by weight of potassium iodide for 10 seconds and stretched in an aqueous solution including 4% by weight of boric acid and 3% by weight of potassium iodide at 60° C. so that the stretching ratio became 6.0 times in total. Then, the obtained stretched film was soaked in an aqueous solution including 5% by weight of potassium iodide for 10 seconds and dried in an oven at 40° C. for 3 minutes to obtain a polarizer having a thickness of 30 μm.

(Production of (Meth)Acrylic Resin Film)

A pellet [a mixture (Tg 127° C.) of 90 parts by weight of (meth)acrylic resin having a lactone ring structure in which $R^1$ is a hydrogen atom and $R^2$ and $R^3$ are methyl groups in the following general formula (I) {copolymerization monomer weight ratio=methyl methacrylate/2-(hydroxymethyl) methyl acrylate=8/2, lactone ring formation rate: about 100%, content ratio of the lactone ring structure: 19.4%, weight average molecular weight: 133,000, melt flow rate: 6.5 g/10 min. (240° C., 10 kgf), Tg 131° C.} and 10 parts by weight of acrylonitryl-styrene (AS) resin {Toyo-AS AS 20 produced by Toyo Styrene Co., Ltd.} was supplied to a biaxial extruder and melt-extruded in a sheet shape at about 280° C. to obtain a (meth)acrylic resin sheet having a lactone ring structure with a thickness of 110 μm. The unstretched sheet was stretched longitudinally by 2.0 times and laterally by 2.4 times under a temperature condition of 160° C. to obtain a (meth)acrylic resin film (thickness: 40 μm, in-plane retardation $\Delta nd$: 0.8 nm, thickness direction retardation Rth: 1.5 nm).

[Chem. 1]

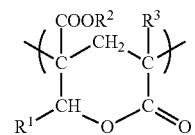

(1)

(Corona Discharge Treatment)

One side of the (meth)acrylic resin film obtained as described above was subjected to corona discharge treatment (corona discharge electron irradiation amount: 77 W/m²/min.).

(Formation of Easy-Adhesion Layer)

16.8 g of polyesterurethane (Superflex 210 (trade name), solid content: 33%, produced by Dai Ichi Kogyo Seiyaku Co., Ltd.), 4.2 g of a cross-linking agent (polymer including oxazoline, EPOCROS WS-700 (trade name), solid content: 25%, produced by Nippon Shokubai Co., Ltd.), 2.0 g of 1% by weight ammonia water, 0.42 g of colloidal silica (Quotron PL-3, solid content: 20% by weight, produced by FUSO CHEMICAL CO., LTD.), and 76.6 g of pure water were mixed to obtain an easy-adhesive composition.

The obtained easy-adhesive composition was applied to the corona discharge treated surface of a (meth)acrylic resin film that had been subjected to corona discharge treatment with a bar coater (#6) so that the thickness of the easy-adhesive composition after being dried became 350 nm. After that, the (meth)acrylic resin film was placed in a hot air drier (140° C.) and the easy-adhesive composition was dried for about 5 minutes to form an easy-adhesion layer (0.3 to 0.5 μm).

(Second Polarizer Protective Film)

A triacetylcellulose film having a thickness of 40 μm was soaked in a 10% sodium hydroxide aqueous solution (60° C.) for 30 seconds to be saponified. After that, the film was washed with water for 60 seconds to obtain a second polarizer protective film.

(Preparation of Adhesive Composition)

100 parts by weight of acetoacetyl group-including polyvinyl alcohol-based resin (average polymerization degree: 1,200, sponification degree: 98.5 mol %, acetoacetyl group modification degree: 5 mol %) and 20 parts by weight of methylol melamine were dissolved in pure water under a temperature condition of 30° C. to obtain an aqueous solution with a solid content of 0.5%. The obtained aqueous solution was used as an adhesive composition under a temperature condition of 30° C.

(Production of Polarizing Plate)

After 30 minutes from the preparation of the above-mentioned adhesive composition, the adhesive composition was applied to the easy-adhesion layer side of the polarizer protective film so that the thickness of the adhesive composition after being dried became 50 nm. Similarly, the adhesive composition was applied to one side of the second polarizer protective film. After that, the polarizer protective film and the second polarizer protective film were each laminated on both sides of the polarizer using a small laminator via the adhesive composition, and the laminate thus obtained was placed in a hot air drier (70° C.), followed by drying for 5 minutes, to obtain a polarizing plate.

Example 2

A polarizing plate was produced in the same way as in Example 1, except for setting the blending amount of colloidal silica to 0.32 g in preparing an easy-adhesive composition.

Example 3

A polarizing plate was produced in the same way as in Example 1, except for setting the blending amounts of colloidal silica and pure water to 0.21 g and 76.7 g respectively in preparing an easy-adhesive composition.

Example 4

A polarizing plate was produced in the same way as in Example 1, except for setting the blending amounts of polyesterurethane, a cross-linking agent, colloidal silica, and pure water to 15.8 g, 3.9 g, 2.5 g, and 75.8 g respectively in preparing an easy-adhesive composition.

Comparative Example 1

A polarizing plate was produced in the same way as in Example 1, except for using the following easy-adhesive composition in forming an easy-adhesion layer.

(Preparation of Easy-Adhesive Composition)

17.0 g of polyesterurethane (Superflex 210 (trade name), solid content: 33%, produced by Dai Ichi Kogyo Co., Ltd.), 4.2 g of a cross-linking agent (polymer including oxazoline, EPOCROS WS-700 (trade name), solid content: 25%, produced by Nippon Shokubai Co., Ltd.), and 78.6 g of pure water were mixed to obtain an easy-adhesive composition.

The polarizer protective film and polarizing plate obtained in each example and comparative example were evaluated as follows. The evaluation results are summarized in Table 1.

1. Take-Up Property of Polarizer Protective Film

The slipperiness at a time of taking up the polarizer protective film obtained above in a roll shape was evaluated, and the state of the polarizer protective film was visually observed, which was left stand for a predetermined period of time after being taken up and deployed again. The evaluation was made based on the following standards.

○: The polarizer protective film can be taken up with good slipperiness, and no wrinkle and fold occur even after an elapse of 24 hours from the take-up.

Δ: Although no wrinkle and fold are recognized immediately after the take-up, wrinkles and folds occur within 24 hours.

x: The slipperiness at a time of taking up the polarizer protective film is poor, and wrinkles and folds occur.

2. Static Coefficient of Friction of Polarizer Protective Film (Between Easy-Adhesion Layer and (Meth)Acrylic Resin Film)

Measurement apparatus: Tribogear TYPE 14 (produced by SHINTO Scientific Co., Ltd.)

A film fixed to a glass plate and a film fixed to a disk made of stainless steel of 10 mmΦ were caused to adhere tightly to each other, and a load of 200 g was applied from above the film fixed to the disk. A static coefficient of friction was obtained from a maximum load of the start of movement when the films were caused to move in a horizontal direction (direction perpendicular to load direction) at 6.0 mm/min.

3. Adhesiveness of Polarizer Protective Film (Adhesiveness Between Easy-Adhesion Layer and (Meth)Acrylic Resin Film)

The easy-adhesive composition used in each example and comparative example was applied by a bar coater to the surface of the (meth)acrylic resin film obtained above so as to have a thickness of 300 nm after drying. The easy-adhesive composition was dried in an oven to form an easy-adhesion layer on the surface of the protective film. Thus, a test sample was obtained.

Regarding the adhesiveness between the (meth)acrylic resin film and the easy-adhesion layer of the obtained test sample, a cross-cut adhesion test was performed in accordance with JIS K5400 3.5. Specifically, cross-cuts each having a size of 1 mm per side were marked on the surface of the easy-adhesion layer of the test sample with a sharp blade. After that, a Scotch tape (24 mm width, JIS Z1522) was caused to adhere tightly to the surface using a wooden spatula. Then, the Scotch tape was peeled off, and the number of cross-cuts, of 100 cross-cuts, that did not adhere to the adhesive tape was counted. More specifically, the case where the easy-adhesion layer is not peeled off is indicated by 100/100, and the case where all the cross-cuts are peeled off is indicated by 0/100.

4. Transmittance and Haze

The transmittance and haze of the polarizing plate obtained above were measured using NDH-1001DP produced by Nippon Denshoku Industries Co., Ltd.

5. Adhesion of Polarizing Plate (Adhesion Between Polarizer and (Meth)Acrylic Resin Film)

A sample chip with a size of 5 cm×5 cm was cut out from the polarizing plate obtained above. The surface of the polarizer protective film was subjected to pressure-sensitive adhesive treatment, and the polarizing plate was attached to a glass plate. After that, one corner portion of the polarizing plate was pinched, and the polarizing plate was peeled in a diagonal direction at a speed of 1 mm/sec. The peeled position was observed. In this case, the polarizing plate was peeled while the corner portion thereof being 90° with respect to the glass plate. The evaluation standard is as follows.

○: The polarizing plate was peeled at an interface between the pressure-sensitive adhesive and the glass plate.

x: The polarizing plate was peeled at an interface between the polarizer and the polarizer protective film.

6. Water Resistance (Adhesiveness)

A sample chip in a rectangular shape with a size of 25 mm×50 mm was cut out from the polarizing plate obtained above and soaked in hot water at 60° C. for 5 hours. After that, the presence/absence of peeling at the interface between the polarizer and the polarizer protective film was observed. The criterion is as follows.
- ○: No peeling was observed.
- Δ: Peeling was observed partially.
- x: Peeling was observed entirely.

7. Moisture Resistance 1 (Adhesiveness)

A sample chip in a rectangular shape with a size of 25 mm×50 mm was cut out from the polarizing plate obtained above, placed in a constant-temperature and constant-humidity apparatus at a temperature of 60° C. and a humidity of 90% RH and left stand for 500 hours. After that, the presence or absence of peeling at the interface between the polarizer and the polarizer protective film was observed visually. The criterion is as follows.
- ○: No peeling was observed.
- Δ: Peeling was observed partially.
- x: Peeling was observed entirely.

8. Moisture Resistance 2 (Color Fastness)

A sample chip in a rectangular shape with a size of 25 mm×50 mm was cut out from the polarizing plate obtained above, placed in a constant-temperature and constant-humidity apparatus at a temperature of 60° C. and a humidity of 90% RH and left stand for 500 hours. After that, the discoloration state was observed visually. The criterion is as follows.
- ○: No discoloration was observed.
- Δ: Discoloration was observed slightly.
- x: Discoloration was observed entirely.

9. Heat Resistance 1 (Adhesiveness)

A sample chip in a rectangular shape with a size of 25 mm×50 mm was cut out from the polarizing plate obtained above, placed in a constant-temperature apparatus at 60° C. and left stand for 500 hours. After that, the presence or absence of peeling at the interface between the polarizer and the polarizer protective film were observed visually. The criterion is as follows.
- ○: No peeling was observed.
- Δ: Peeling was observed partially.
- x: Peeling was observed entirely.

10. Heat Resistance 2 (Color Fastness)

A sample chip in a rectangular shape with a size of 25 mm×50 mm was cut out from the polarizing plate obtained above, placed in a constant-temperature apparatus at 60° C. and left stand for 500 hours.

After that, the discoloration state was observed visually. The criterion is as follows.
- ○: No discoloration was observed.
- Δ: Discoloration was observed slightly.
- x: Discoloration was observed entirely.

TABLE 1

|  | Example 1 | Example 2 | Example 3 | Example 4 | Comparative Example 1 |
|---|---|---|---|---|---|
| Take-up properties | ○ | ○ | Δ | ○ | x |
| Static coefficient of friction | 0.2 | 0.4 | 0.5 | 0.2 | 0.8 |
| Adhesiveness | 100/100 | 100/100 | 100/100 | 100/100 | 100/100 |
| Transmittance | 92.6 | 92.6 | 92.7 | 92.3 | 92.6 |
| Haze | 0.3 | 0.3 | 0.3 | 0.5 | 0.3 |
| Adhesion | ○ | ○ | ○ | ○ | ○ |
| Water resistance | ○ | ○ | ○ | ○ | ○ |
| Moisture resistance 1 (Adhesiveness) | ○ | ○ | ○ | ○ | ○ |
| Moisture resistance 2 (Color fastness) | ○ | ○ | ○ | ○ | ○ |
| Heat resistance 1 (Adhesiveness) | ○ | ○ | ○ | ○ | ○ |
| Heat resistance 2 (Color fastness) | ○ | ○ | ○ | ○ | ○ |

As is apparent from Table 1, Examples 1, 2, and 4 were excellent in take-up properties without causing blocking during take-up. Example 3 had slightly poor take-up properties compared with those of Examples 1, 2, and 4, however, the take-up properties of Example 3 were at a negligible level. On the other hand, Comparative Example 1 was poor in take-up properties, causing blocking.

Examples 1 to 4 and Comparative Example 1 were excellent in an adhesion, water resistance, moisture resistance, and heat resistance, and also excellent in transmittance and haze.

INDUSTRIAL APPLICABILITY

The polarizer protective film and the polarizing plate of the present invention may be suitably used for image display apparatuses such as a liquid crystal display apparatus and a self-luminous display apparatus.

REFERENCE SIGNS LIST

10 polarizer protective film
11 (meth)acrylic resin film
12 easy-adhesion layer
13 adhesive layer
14 polarizer
100 polarizing plate

The invention claimed is:

1. A polarizer protective film, comprising:
  a (meth)acrylic resin film; and
  an easy-adhesion layer formed of an easy-adhesive composition including a urethane resin, fine particles and a cross-linking agent, wherein
  the (meth)acrylic resin film comprises 50-100 wt % of (meth)acrylic resin,
  the urethane resin has a carboxyl group,
  the fine particles comprise colloidal silica, and
  the cross-linking agent has an oxazoline group,
  wherein the fine particles are included in an amount of 0.3 to 10 parts by weight with respect to 100 parts by weight of the urethane resin.

2. A polarizer protective film according to claim 1, wherein the fine particles have a particle diameter of 10 to 200 nm.

3. A polarizer protective film according to claim 1, wherein the (meth)acrylic resin has a lactone ring structure.

4. A polarizer protective film according to claim 1, wherein a side of the (meth)acrylic resin film on which the easy-adhesion layer is formed is subjected to corona discharge treatment or plasma treatment.

5. A polarizing plate, comprising:
  a polarizer; and
  the polarizer protective film according to claim 1.

6. An image display apparatus, comprising the polarizing plate according to claim 5.

* * * * *